United States Patent [19]

Spears

[11] 4,100,940

[45] Jul. 18, 1978

[54] TRICKLE EMITTER FOR SUBTERRANEAN IRRIGATION

[76] Inventor: Robert Wayne Spears, 13672 Wheeler Ave., Sylmar, Calif. 91342

[21] Appl. No.: 551,641

[22] Filed: Feb. 21, 1975

Related U.S. Application Data

[63] Continuation of Ser. No. 233,156, Mar. 9, 1972, abandoned.

[51] Int. Cl.² ............................................. F16K 15/04
[52] U.S. Cl. ..................................... 137/877; 137/883; 138/45; 239/542; 137/236 R
[58] Field of Search ............... 137/608, 236, 877, 883; 239/542; 285/3; 138/39, 45

[56] References Cited

U.S. PATENT DOCUMENTS

| | | | |
|---|---|---|---|
| 2,143,477 | 1/1939 | Dillon | 138/39 |
| 2,598,961 | 6/1950 | Andrus | 239/542 UX |
| 3,470,893 | 10/1969 | Nelson | 285/3 X |
| 3,595,524 | 7/1971 | Mominee | 251/342 |
| 3,606,166 | 9/1971 | Whear | 239/542 X |
| 3,746,263 | 7/1973 | Reeder | 239/542 |
| 3,840,182 | 10/1974 | Geoffroy | 239/542 X |

*Primary Examiner*—Alan Cohan
*Attorney, Agent, or Firm*—Gardner and Anten

[57] ABSTRACT

An irrigation pipeline has a plurality of emitters equipped with discharge nipples for engagement by flexible hoses to release water at a trickle rate at selected subterranean locations within the radii of the hoses. A plurality of the nipples may be integral with a plastic manifold that is installed between confronting pipe ends and some of the nipples may be blind nipples that are sheared for activation of the emitters as required to meet increased demand for water.

8 Claims, 6 Drawing Figures

U.S. Patent      July 18, 1978      4,100,940
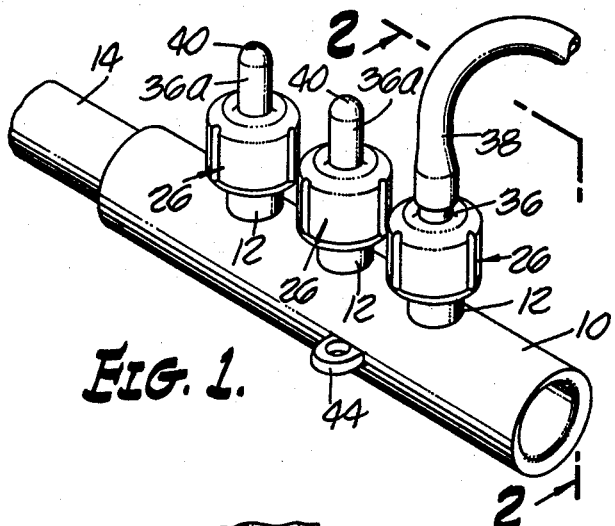
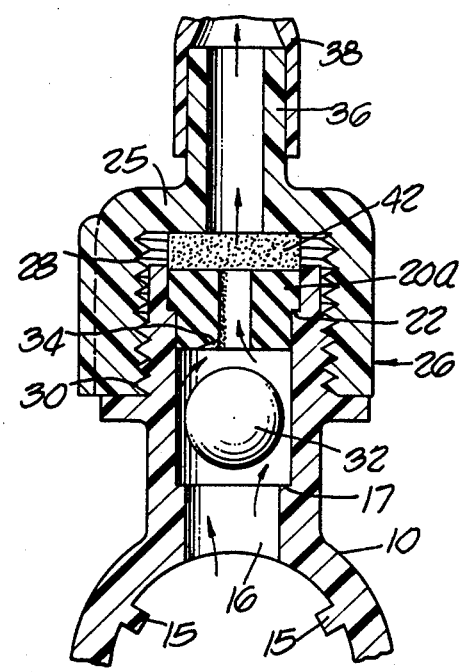
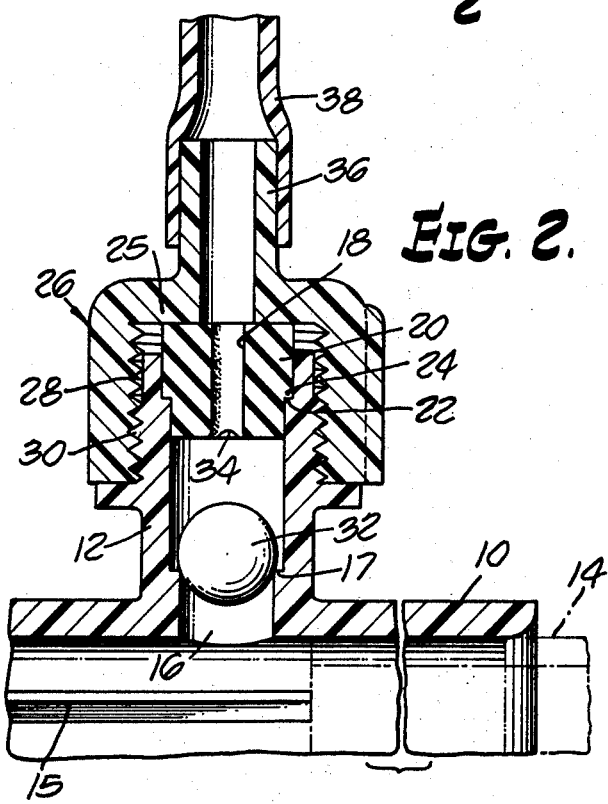
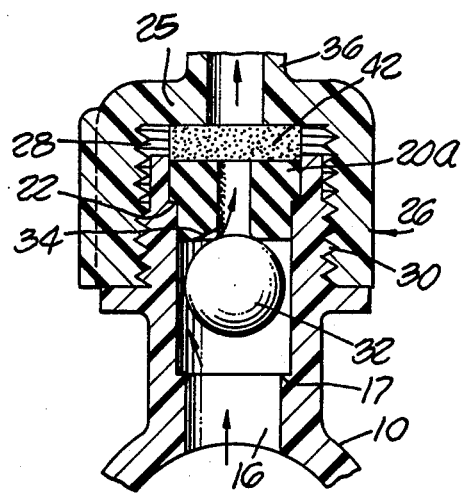
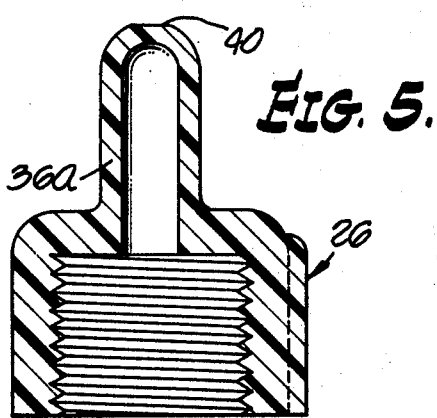
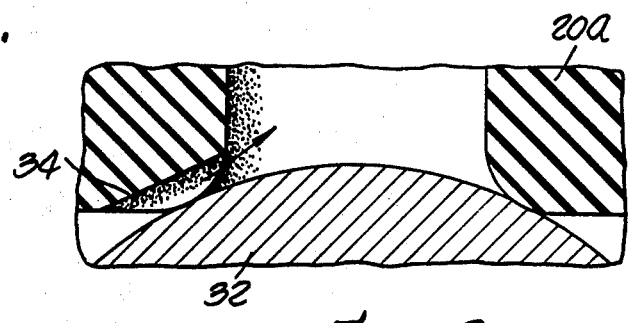

TRICKLE EMITTER FOR SUBTERRANEAN IRRIGATION

This is a continuation of application Ser. No. 233,156 filed Mar. 9, 1972, now abandoned.

BACKGROUND OF THE INVENTION

Increasingly successful "drip" irrigation has heretofore been carried out by burying small diameter plastic pipelines in the soil with the pipelines equipped with spaced emitters that release water at minute rates. Emitters of this type now in commercial use are disclosed in copending patent applications by Theodore J. Todd, Ser. No. 60,523, filed Aug. 3, 1970 (U.S. Patent No. 3,841,349) and Ser. No. 161,838, filed July 12, 1971 (U.S. Pat. No. 3,727,635).

Typically, the emitters extend upright from the plastic pipe and each emitter incorporates two provisions to discourage the entrance of soil into its interior. One provision is a valve member that normally seats in a lower valve seat to cut off the emitter from the pipeline. When the water is turned on, the valve member rises from the lower valve seat to an upper valve seat to restrict the outflow of the emitter to a minute rate and in doing so permits the initial water flow to flush out the interior of the emitter. The second provision is that the emitter has downwardly directed discharge passages to discourage gravitation of soil and foreign particles into the emitter through the discharge passages.

Such an arrangement serves its purpose but the area irrigated by a single pipeline is limited in width to the diameter of a wet zone created by an individual emitter. To irrigate a wider area, plural parallel pipes must be used with the pipes spaced apart by no more than the diameter of a wet zone.

SUMMARY OF THE INVENTION

One object of the invention is to increase the width of the area that can be irrigated by an emitter-equipped pipeline at relatively little additional cost and thus increase the irrigation capacity of the pipeline.

Another object of the invention is to make the emitter capable of releasing water into the soil at any desired depth including depths below the level of the pipeline instead of the release being limited to levels above the level of the pipeline. This capability makes it unnecessary to bury the pipeline at a depth below the level at which the water is to be released. The installation cost of the irrigation system may be greatly reduced by burying the pipe at a shallower depth than heretofore and the installation cost may be reduced even further by simply laying the pipeline on the surface of the ground.

A further object of the invention is to simplify the problem of preventing entrance of soil and foreign material into the emitter and in doing so to eliminate the need for constructing the emitter body with downwardly directed discharge passages.

A still further and highly important object of the invention is to provide a drip irrigation system with the capability of increasing the number of water release points at minimum cost to meet future increased demand.

Still another object is to make it a simple matter to ascertain whether or not an emitter is functioning. If the pipeline is buried it is not necessary to uncover an emitter to see whether or not it is operating. Instead, the buried end of the hose may be simply pulled from the soil for inspection.

Broadly described, the various objects of the invention are achieved by providing each emitter with an upwardly directed discharge nozzle instead of downwardly directed peripheral discharge passages and by attaching to each nozzle a suitable small diameter flexible hose with freedom to bury the discharge end of the hose at any selected depth and at any selected location within the radius defined by the length of the hose. In a preferred practice of the invention the emitter, including the discharge nipple, is made of a suitable plastic material and to attach a flexible hose to the nipple it is merely necessary to telescope an end portion of the hose over the nipple.

To make it possible to increase the capacity of a pipeline to meet growing demand, the pipeline is initially equipped with more emitters than needed for the initial water demand within the areas served by the pipeline and the surplus emitters are equipped with blind discharge nipples. To activate an emitter for release of more water within the area served by the pipeline, it is merely necessary to cut off the blind end of the nipple of an inactive emitter and then to telescope a small diameter flexible hose over the truncated nipple.

As heretofore pointed out, the width of the area over which the water may be distributed by a pipeline equipped with emitters of the prior types is limited to the diameter of the wet area produced by a single emitter. To increase the width of the distribution area by 100% it is necessary to lay a second pipeline at a spacing from the first pipeline that is no greater than the diameter of a wet area, and to increase the width of the area by 200% it is necessary to add a third parallel pipeline.

In the new drip irrigation system it is possible to equip half of the emitters with hoses equal in length to the radius of a wet spot to produce two rows of wet spots that lie on opposite sides respectively of the pipeline and are approximately tangential to the pipeline. The remaining hoses may be of a length equal to one-half the diameter of a wet spot to provide two additional rows of wet spots tangential to the first two rows. Thus, the new system makes it possible to increase the distribution capacity of a single pipeline by fourfold or more. If such a pipeline is laid on the surface of the ground all of the emitters for the four rows of wet spots are completely exposed and are constantly accessible for inspection.

Since soil or foreign particles can migrate to the interior of an emitter only by travelling the length of the hose and since the hose is flushed out each time the water is turned on, it is extremely unlikely that soil or foreign material will enter the emitter by the hose. In this regard, a feature of the invention is that the nipple is integral with a cap of the emitter structure and an elastomeric bushing inside the emitter body is under sealing compression to keep any foreign material from entering the emitter from under the cap.

A further object of the invention is to reduce both the cost of fabricating an emitter and the cost of installing an emitter in a pipeline. This object is achieved by molding a plastic manifold with a row of closely spaced emitter bodies integral therewith, the manifold being dimensioned to telescope over confronting pipe ends in a pipeline. If desired, all of the nipples of the emitters may be blind nipples to be truncated as needed.

The various features and objects of the invention may be understood from the following detailed description and the accompanying drawing.

BRIEF DESCRIPTION OF THE DRAWING

In the drawing, which is to be regarded as merely illustrative:

FIG. 1 is a perspective view of a plastic manifold with a row of emitter bodies integral therewith and with the emitter bodies provided with caps that have integral nipples;

FIG. 2 is an enlarged cross section of a nipple with a hose connected thereto, the cross section being taken along the line 2—2 of FIG. 1 with the valve ball in its lower seat prior to initiation of water flow through the pipeline;

FIG. 3 is a view similar to FIG. 2 showing an alternate form of elastomeric bushing in the emitter and showing the valve ball rising from its lower seat during an initial flushing period when the water is first turned on;

FIG. 4 is a view similar to FIG. 3 showing the valve ball against the upper valve seat to restrict the release of water to a minute rate;

FIG. 5 is a cross sectional view of an emitter cap equipped with a blind nipple; and FIG. 6 is a greatly enlarged portion of FIG. 4 showing how the water flow is restricted to the capacity of a notch or recess in the upper valve seat.

DESCRIPTION OF THE PREFERRED EMBODIMENT OF THE INVENTION

In prevalent drip irrigation systems of the present type the emitters are fabricated separately from the pipeline and the pipeline is provided with spaced upper radial bores in which the emitters are mounted. In practicing the present invention the emitters may also be fabricated separately from the pipeline but a feature of the invention is the concept of making the emitter bodies integral with a plastic manifold that is shaped and dimensioned for insertion in a pipeline between two confronting pipe ends. The manifolds may be spaced apart by the full length of a standard plastic pipe or standard lengths of plastic pipe may be divided into sections for the insertion of as many manifolds as may be desired.

In the initial practice of the invention as illustrated by FIGS. 1 and 2, a manifold 10 with a row of three integral emitter bodies 12 is molded of suitable plastic material with the two opposite ends of the manifold dimensioned to telescope over the confronting end of lengths of plastic pipe. Such a plastic pipe may be of any length in accord with the desired spacing between the successive manifolds. FIG. 1 shows in solid lines a plastic pipe 14 telescoped into one end of the manifold and FIG. 2 shows in phantom a second pipe 14 telescoped into the other end of the manifold.

A feature of this embodiment of this invention is that the interior of the manifold 10 is provided with at least one longitudinal rib 15 with the opposite ends of the rib serving as stops for the corresponding ends of the plastic pipe. Preferably, there are at least three such ribs 15 of equal circumferential spacing. Such ribs are conducive to laminar flow and minimize the turbulence caused by water flow into the emitters.

Each emitter body 12 is in the form of a valve cage having a lower inlet port 16 and having an upper outlet port 18 that is formed by a bushing or valve seat member 20 made of a suitable resiliently deformable elastomer, for example Buna-N rubber of 85 Shore hardness.

In the construction shown, the upper end of the valve cage 12 is of stepped configuration to form an upwardly facing annular shoulder 22 and the valve seat member 20 is of corresponding stepped configuration with a downwardly facing outer circumferential shoulder 24 that seats against the annular shoulder of the valve cage. The elastomer valve member 20 projects above the upper open end of the valve cage.

The elastomer valve seat member 20 is retained in the upper end of the valve cage by a transverse end wall 25 of a removable cap or closure 26. In the construction shown the cap 26 has an internal screw thread 28 which engages an external screw thread 30 of the valve cage 12.

A valve member for cooperation with the two valve seats may be of any suitable configuration and may be made of any suitable material. In the present embodiment of the invention the valve member is a stainless steel ball 32 which normally rests in the lower inlet valve seat 16 and which is of somewhat smaller diameter than the inside diameter of the cage to provide adequate clearance around the ball for the initial flushing action. In this particular embodiment of the invention, the inside diameter of the valve cage is approximately 0.370 inch; the diameter of the ball 32 is 5/16 inch; the inside diameter of the inlet port 16 is 11/64 inch; and the inside diameter of the outlet port 18 of the upper valve seat member 20 is 1/8 inch.

Any suitable by-pass or restricted passageway may be provided for release of the water at the desired retarded rate when the steel ball 32 is in the upper valve seat that is formed by the valve seat member 20. In this particular embodiment of the invention, the restricted passageway is simply a by-pass recess in the form of a notch or groove 34 in the valve seat of the upper valve seat member 20.

When the pipeline is cut off from the pressurized water supply, the steel ball 32 of an emitter is in its lower idle position closing the lower valve seat 17 as shown in FIG. 2. It is to be noted that at this closed position the steel ball not only acts as a check valve to prevent reverse flow from the emitter into the manifold, but also serves as a closure to keep any foreign material in the cage from dropping into the manifold.

When a remote supply valve (not shown) is opened to place the pipeline under pressure, say pressure in the range of 10–30 p.s.i., the steel ball 32 is lifted from the lower valve seat 17 as shown in FIG. 3. The steel ball is small enough in diameter relative to the inside diameter of the cage to permit the newly admitted water to flow around the ball as indicated by arrows in FIG. 3 for the purpose of flushing out the valve cage but, nevertheless, the dynamic pressure against the underside of the ball is sufficient to lift the ball to its upper closed position shown in FIG. 4.

Once the steel ball 32 reaches its upper closed position shown in FIG. 4, it is held in place by the pressure differential across the steel ball and the steel ball remains in its upper closed position even though the pressure inside the cage may drop to 1 or 2 p.s.i. As long as the steel ball remains at its upper closed position with the interior of the valve cage in communication with the pressurized water source, the discharge from the emitter is restricted to the rate of flow through the by-pass 34 which is a trickle rate that, for example, may be approximately one gallon per hour. When the pipeline is cut off from the pressurized source, the interior of the cage drops to atmospheric pressure and the steel ball gravitates to its normal lower idle position shown in FIG. 2.

The cap 26 which is made of a suitable plastic is formed with an axial nipple 36 and one end of a hose 38 of suitable flexible plastic or elastomer is telescoped over the nipple in a fluid-tight manner. It is apparent in FIG. 2 that the cap 26 is normally tightened to hold the elastomeric valve seat member 20 in position and therefore places the valve seat member under compression in an annular zone defined by the annular shoulder 22 of the valve cage. Thus, the annular valve seat member 20 forms an annular fluid-tight seal to prevent foreign material from migrating into the interior of the cage from under the cap 26.

The opposite end of the hose 38 is buried in the soil to an appropriate depth, which depth is independent of the level of the pipeline. The hose 38 may be relatively short to form a wet spot that is close to the pipeline or may be of a length to form a wet spot that is approximately tangential to the pipeline. As heretofore stated, the hose 38 may be even longer, for example, long enough to form a wet spot that is tangential to a wet spot which in turn is tangential to the pipeline 14. It is apparent that four rows of wet spots may be readily created in this manner with the pipeline extending centrally of the four rows.

FIGS. 1 and 5 show how a cap 26 of an emitter may be formed with a blind nipple 36a having an outer end wall 40. The cap is made of a suitable plastic material that may be readily sheared to remove the end wall 40 of the nipple 36a and thus convert the nipple to the configuration of the nipple 36 in FIG. 2. Thus, a pipeline may be provided with a number of emitters with blind nipples 36a in excess of the initial demand of water from the pipeline. As need arises to provide more wet spots for the growth of plant life, the emitters with the blind nipples may be activated by simply shearing off the ends of the nipples and then mounting hoses 38 of suitable length on the truncated nipples.

FIG. 6 is an enlarged portion of FIG. 4 showing how the steel ball 32 pressed against the upper valve seat that is formed by the annular valve seat member 20. When the water pressure is relatively low, the pressure of the ball 32 against the valve seat does not distort the elastomeric material of the valve seat to any appreciable degree. If the water pressure is relatively high, however, the ball 32 distorts the elastomeric material of the valve seat member and thus decreases the effective cross section of the by-pass 34 to compensate for the increased water pressure, as taught by the disclosure of the previously mentioned copending patent application Ser. No. 161,838.

FIGS. 3 and 4 show an elastomeric valve seat member 20a which may be substituted for the annular valve seat member 20 of FIG. 2. The valve seat member 20a has a diametrical slot 42 across its upper end as required for use in the emitters disclosed in the above mentioned two applications wherein the water is released from the emitter through downwardly extending discharge passages that are defined by the cap and valve body. Thus, an elastomeric valve seat member 20a may be used either in an emitter of the present type having a nipple 36 or in an emitter of the earlier type that does not have a nipple.

If the pipeline is to be laid on the surface of the ground instead of being buried underground, it is desirable to anchor the pipeline. For this purpose each of the manifolds 10 is formed with an integral lateral ear 44 on at least one of its two sides for cooperation with suitable anchor means. For example, a non-corrosive metal pin such as a galvanized nail may be driven into the ground through the eye of the ear 44.

Our description in specific detail of the presently preferred embodiment of the invention will suggest to those skilled in the art various changes, substitutions and other departures from our disclosure within the spirit and scope of the appended claims.

We claim:

1. In an emitter for dispensing water at a minute rate from a pipe, for subterranean irrigation:
    means on the top of said pipe defining an open top valve cage;
    a closure screw threadedly engaging the top of said cage and having a tubular nipple extending upwardly and communicating with the interior of said cage;
    a flexible hose of relatively small diameter telescopically connected to said nipple;
    a valve member in said cage free to rise to an upper valve seat in the cage in response to initial water flow through the cage, there being a minute passage by-passing the seat for releasing water from the cage when the valve member is in the seat, said valve seat being an elastomer bushing;
    the lower portion of said bushing being of reduced diameter to define a downwardly facing outer circumferential shoulder;
    the upper portion of the valve cage being enlarged to define an upwardly facing inner circumferential shoulder to mate with the bushing shoulder to permit the closure to be screw threadedly tightened to compress the bushing between the closure and the inner circumferential shoulder of the valve cage.

2. An improvement as set forth in claim 1 in which the bushing has a bore therethrough concentric to the nipple whereby the compressed bushing forms a seal around the entrance to the nipple to prevent leakage around the periphery of the closure.

3. An improvement as set forth in claim 1 in which said closure is a cap that telescopes over the open top of the valve cage.

4. The combination of:
    a manifold for installation between two confronting pipe ends in a pipeline for subterranean irrigation, said manifold having a plurality of peripheral openings and closures therefor;
    a corresponding plurality of emitters at said peripheral openings, each closure being comprised of a cap and having an outlet defined by a tubular nipple;
    and hoses connected to said outlets to receive water therefrom, said hoses being flexible to permit the outer ends of the hoses to be buried in the ground at selected locations within the radii defined by the hoses;
    said manifold and the bodies of the emitters thereon being integral and having open ends;
    said nipples being integral with the closures;
    a valve member in each of the bodies, free to rise to an upper valve seat in the body in response to initial flow of water from the cage, there being a minute passage by-passing the seat for releasing water when the valve member is in the seat;

said valve seat being formed by an elastomer bushing under sealing compression between the emitter body and the cap.

5. A combination as set forth in claim 4 which includes means united with the manifold to facilitate anchorage of the manifold to the ground when the pipeline is laid on the surface of the ground.

6. A combination as set forth in claim 5 in which said means is integral with the casting and has an opening for engagement by anchorage means.

7. A combination as set forth in claim 4 in which the opposite ends of the manifold are dimensioned to telescope over confronting pipe ends; and in which at least one longitudinal inner rib is formed on the inner circumferential wall of the manifold, said rib extending past said peripheral openings but terminating short of the opposite ends of the manifold to serve as stop means for the confronting pipe ends to prevent said pipe ends from entering said manifold far enough to obstruct any of said openings.

8. A combination as set forth in claim 7 in which the manifold is formed with a plurality of circumferentially spaced inner longitudinal ribs to tend to discourage turbulent flow through the manifold.

* * * * *